United States Patent [19]

Takano et al.

[11] Patent Number: 4,838,835
[45] Date of Patent: Jun. 13, 1989

[54] VARIABLE SPEED PULLEY

[75] Inventors: Hiroshi Takano; Yasuhiro Hashimato, both of Miki, Japan

[73] Assignee: Mitsuboshi Belting, Ltd., Nagata, Japan

[21] Appl. No.: 228,189

[22] Filed: Aug. 4, 1988

Related U.S. Application Data

[62] Division of Ser. No. 67,691, Jun. 29, 1987, Pat. No. 4,789,378.

[30] Foreign Application Priority Data

Jun. 30, 1986 [JP] Japan ............... 61-153666

[51] Int. Cl.$^4$ ............................................. F16H 11/02
[52] U.S. Cl. ....................................................... 474/13
[58] Field of Search ........................... 474/8, 11–13, 474/17, 18, 28, 69, 70

[56] References Cited

U.S. PATENT DOCUMENTS 4,515,575 5/1985 Kinbara et al. ...................... 474/13

FOREIGN PATENT DOCUMENTS 42-12433  7/1968  Japan .
50-47064  4/1975  Japan .
51-6815   3/1976  Japan .
62-450    1/1987  Japan .

Primary Examiner—Thuy M. Bui
Attorney, Agent, or Firm—Wood, Dalton, Phillips, Mason & Rowe

[57] ABSTRACT

A variable speed pulley having rearrangement structure for causing uniform distribution of a plurality of force applying elements utilized to control the width of the pulley groove as a function of the centrifugal forces developed during changes in the speed of the pulley. The rearrangement structure includes a coil spring connected in the structure to permit relative rotational movement between the fixed and movable pulley sheave halves as a result of changes of the force applied to the movable pulley sheave half during driving operation of the pulley. The rearrangement structure effectively minimizes vibration and noise by providing improved uniformity in the distribution of the force applying elements both in the steady state and speed and force changing conditions of the pulley.

17 Claims, 2 Drawing Sheets

VARIABLE SPEED PULLEY

This is a division of application Ser. No. 067,691 filed June 29, 1987; now U.S. Pat. No. 4,789,378.

TECHNICAL FIELD

This invention relates to power transmission belt pulleys and in particular to variable speed power transmission belt pulleys.

BACKGROUND ART

In one form of conventional variable speed pulley, a movable pulley sheave half is urged toward a fixed sheave half by a spring. When the V-belt received in the pulley groove defined by the confronting faces of the sheave halves is urged radially inwardly as by an increase in tension force applied in the belt, the belt overcomes the biasing force of the spring, permitting the movable sheave to move away from the fixed sheave and thereby reducing the effective diameter of the pulley, and thereby automatically varying the speed of the pulley driven by the belt.

It has further been known to provide means for axially moving the movable sheave half as a function of the speed of the pulley. One such structure is illustrated in Japanese Utility Model Patent No. 42-12433. As shown in the drawing thereof, a plurality of small spherical elements, such as ball bearings, are retained in a space confronting a radially inclined outer surface of the movable sheave. As the speed of the pulley increases, the spherical bodies are urged radially outwardly by centrifugal force and generate an axial force tending to urge the movable sheave so as to reduce the width of the belt receiving groove. Thus, the spherical elements augment the biasing force of the axially acting spring, whereby the total biasing force acting on the movable sheave is a composite of the spring force and the speed-related force generated by the spherical elements.

A serious problem, however, arises in the pulley structure of the Japanese Pat. No. 42-12433 in that the spherical elements tend to be heterogeneously distributed in the annular space in which they are contained. As shown in FIG. 4 of the Japanese Pat. No. 42-12433, when the pulley is at a standstill, the spherical bodies gravitate to the bottom of the space. When the pulley is rotated, the centrifugal force tends to maintain the spherical bodies in the same portion of the annular space, thereby generating vibrations and noise resulting from the unbalanced condition of the pulley. As rotation of the pulley is continued, the spherical bodies tend to move circumferentially of the annular space, and eventually may be disposed entirely circumferentially thereof. However, it has been found that there is a tendency for the spherical bodies to nonuniformly distribute themselves as a result of friction. Undesirable bridging occurs so that even after a substantial period of running of the pulley, vibration and noise continues.

The pertinent structure of the Japanese Pat. No. 42-12433 is illustrated in FIGS. 9 and 10 of the drawing hereof. As shown therein, the pulley structure includes a plurality of spherical force transmitting elements 5 which collect in a lower portion of the space 6 in which they are retained when the pulley is in a standstill position, as shown in FIG. 10. When the pulley is rotated, the centrifugal forces developed in the elements 5 tend to urge them toward an outer disposition, as shown in FIG. 9. It has been found, however, that the elements 5 do not uniformly redistribute themselves circumferentially about the outer portion of the space 6 and vibration and noise occur not only during speedup, but also during subsequent changes, as well as during steady state operation of the pulley. Thus, the pulley structure of Japanese Pat. No. 42-12433 has not proven fully satisfactory in use.

It is further known to mount the movable sheave half on the shaft for both axial and rotative movement. The biasing spring comprises a helical spring having one end connected fixedly to the shaft, and the opposite end connected fixedly to the movable sheave. In such an arrangement, the spring not only biases the movable sheave half toward the opposite sheave half, but also permits some angular displacement of the movable sheave half about the axis of the shaft so as to accommodate shock forces and the like generated in the operation of the belt drive. One example of such a pulley structure is illustrated in U.S. Pat. No. 4,626,227, of Hiroshi Takano, one of the inventors hereof, which patent is owned by the assignee hereof.

DISCLOSURE OF INVENTION

The present invention comprehends an improved variable speed pulley structure utilizing force applying means having a variable extension parallel to the shaft axis proportional to the centrifugal force acting thereon as a result of the speed of rotation of the pulley, and wherein rearrangement means are provided for varying the arrangement of the force applying means as an incident of relative movement between the first and second sheave angularly about the axis of rotation.

In the illustrated embodiment, the rearrangement means utilizes a spring providing a change in the relative rotational positions of the surfaces defining the opposite sides of a space in which the force applying means is disposed. The force applying means is rearranged as a result of force transfer thereto from the opposite surfaces as they move relative to each other.

In the illustrated embodiment, the force applying means comprises a plurality of small spherical elements, and the rearrangement means acts to uniformly distribute the elements throughout the annular space in which they are received between the thusly relatively movable opposite surfaces defining the space.

For further facilitated uniform distribution of the force applying means during drive operation of the pulley, lubricating means may be provided for reducing friction between the respective elements.

In one form, the elements are provided with a low friction coating. Alternatively, lubricant may be provided in the space.

In one form, the rearrangement means is disposed radially inwardly of the force applying means, and in a second form, the rearrangement means is disposed axially outwardly thereof.

The spherical elements are preferably of small diameter and, more specifically, in the illustrated embodiment, have a diameter in the range of approximately 1 to 6 mm. Improved functioning has been found to result from the provision of the spherical elements having a diameter in the range of approximately 2 to 4 mm.

All of the rounded elements may have a similar rounded shape. Alternatively, the rounded elements may comprise a mixture of elements having different rounded shapes.

Improved functioning of the pulley structure has been found to result from a limitation of the quantity of the force applying rounded elements in the annular space so as to fill no more than approximately 80 percent of the volume of the space when the space is caused to be at its minimum volume.

The variable speed pulley of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
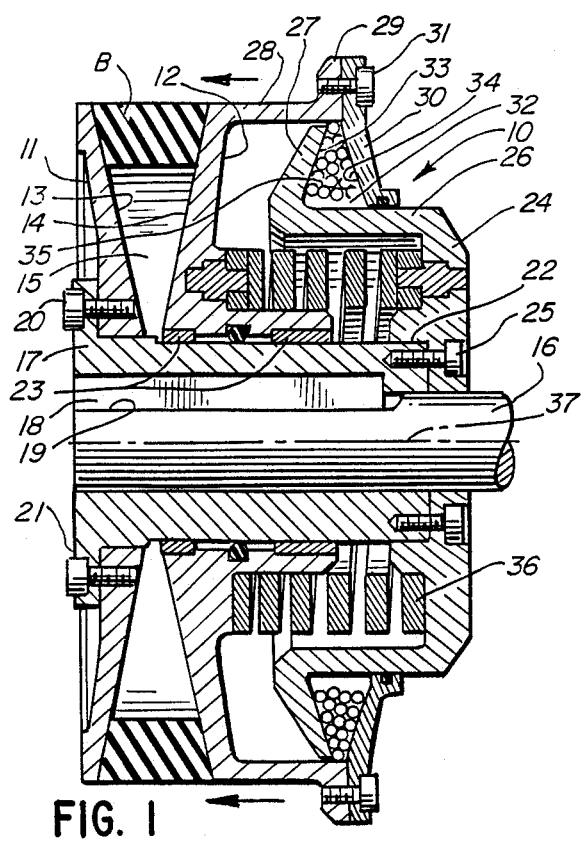
FIG. 1 is a diametric section of a variable speed pulley embodying the invention, with the pulley components arranged to provide a maximum operating diameter thereof.

In the illustrative embodiment of the invention as disclosed in the drawing, a variable speed pulley generally designated 10 is shown to comprise a first sheave half 11 and a second sheave half 12 defining confronting faces 13 and 14, respectively, defining a belt receiving groove 15.

Sheave half 11 is fixedly associated with a power drive shaft 16 by means of a sleeve 17 locked to the shaft 16 by a key 18 received in a keyway 19 in the shaft. A plurality of bolts 20 extend through an annular flange 21 on the sleeve and are threaded into the sheave half 11, as shown in FIG. 1.

Sheave half 12 comprises a movable sheave half coaxially mounted to a cylindrical outer surface 22 of the sleeve 17 on annular sleeve bearings 23, which illustratively may be formed of copper alloy, polytetrafluoroethylene, oil-containing metal, etc., whereby sheave half 12 is both axially and rotatively readily movable on the sleeve.

An annular stopper 24 is fixedly secured to the sleeve 17 by a plurality of bolts 25 and, thus, is fixed against rotation and axial movement relative to the shaft 16.

As illustrated in FIG. 1, the stopper includes a radially outer, longitudinally extending annular portion 26 and an outturned distal flange 27.

Sheave half 12 defines a radially outer annular wall 28 provided with a distal, radially outturned annular flange 29.

An annular closure wall 30 is fixedly mounted to flange 29 by a plurality of bolts 31. A space, or chamber, 32 is formed between an axially outer facing surface 33 of flange 27, and an axially inwardly facing surface 34 of closure wall 30.

Force applying means in the form of a plurality of small rounded elements 35 are provided in space 32, which is thusly effectively enclosed by stopper wall 26, distal flange 27, extension wall 28 of sheave half 12, and closure wall 30.

Figure 3:
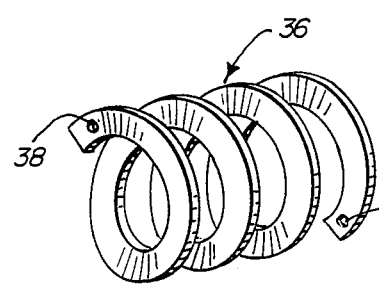
FIG. 3 is a perspective view of the spring providing for rearrangement of the force applying means of the pulley structure.

Movable sheave half 12 is biased toward fixed sheave half 11 by a helical spring 36 extending concentrically of the axis 37 of shaft 16. As shown in FIG. 3, the distal end portions of springs 36 are provided with apertures 38 and 39, respectively.

Figure 2:
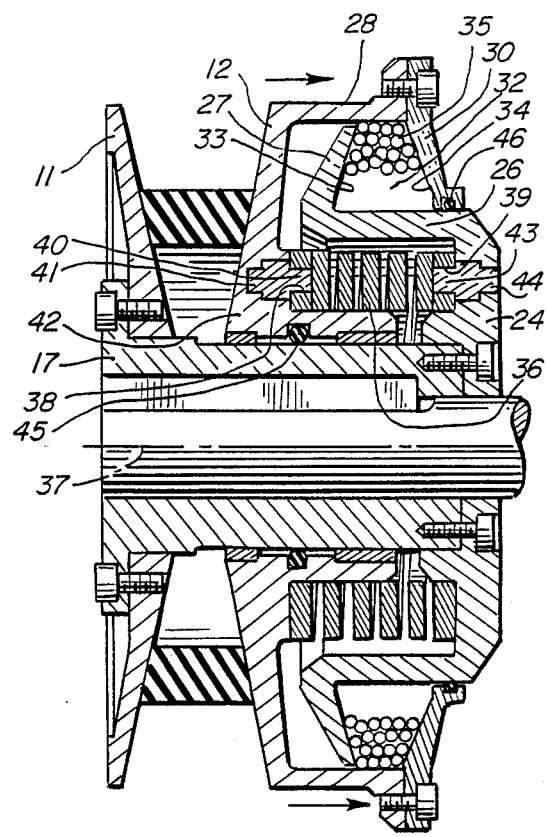
FIG. 2 is a diametric section illustrating the arrangement of the pulley structure of FIG. 1, with the pulley rearranged to define a smaller diameter effective pulley configuration.

As illustrated in FIG. 2, spring aperture 38 receives the axially projecting end 40 of a retaining pin 41 secured in a mounting portion 42 of sheave half 12.

As further illustrated in FIG. 2, the opposite spring end aperture 39 receives a projecting portion 43 of a retaining pin 44 mounted in the stopper 24. Thus, spring 36 is captured under compression between the sheave portion 42 and stopper 24, with the opposite ends of the spring connected thereto to effect alternative winding and unwinding of the spring corresponding to opposite rotational displacement of the movable sheave half 12 on sleeve 17, as during driving operation of the pulley.

As the distal flange 27 is fixed to sleeve 17, rotative displacement of sheave half 12 about the sleeve causes rotative displacement between surfaces 33 and 34 axially bounding the space 32, thereby imparting distributing forces to the rounded elements 35 effectively eliminating nonuniform distribution and bridging of the elements in the annular space 32 when the pulley is brought to operating speed from a standstill condition wherein the rounded elements tend to collect at the bottom of the space under the force of gravity.

The invention further comprehends the provision of means for reducing friction between the rounded elements 35. Illustratively, fluid lubricant may be provided in the spaces in which the spring 36 and rounded elements 35 are disposed and maintained against leakage therefrom by a pair of O-rings 45 and 46 in movable sheave half mounting portion 42 and closure wall 30, respectively. Thus, O-ring 45 seals sheave half 12 to the sleeve 17 and O-ring 46 seals closure wall 30 to the annular portion 26 of the stopper, as illustrated in FIG. 2.

The force applying means are illustrated in the drawing as comprising relatively small diameter, rounded, or spherical, elements. The illustrated elements may have a diameter in the range of approximately 1 to 6 mm., and preferably, in the range of approximately 2 to 4 mm.

The invention comprehends that the force applying means may be particulate, such as powder and the like. The force applying elements 35 may be formed of conventional steel, copper, stainless steel, tungsten, etc.

The elements may be coated, such as with a synthetic resin, metal powder embedded in resin, or other friction reducing means. Any suitable fluid lubricant may be utilized for reducing the friction between the elements 35, as discussed above.

In the illustrated embodiment, the elements have a regular spherical shape. Elements deviating from a true spherical shape may be utilized, and have been found to further reduce bridging and uniformity of distribution.

The invention comprehends that all of the elements may have the same shape and size as well as having different shapes and sizes.

While the amount of force applying elements may be as desired, it has been found to be advantageous to limit the amount of such material to approximately 80% of the volume of the space 32 in its smallest configuration, such as illustrated in FIG. 1.

As seen in FIGS. 1 and 2, the space 32 has a generally triangular configuration in the minimum volume arrangement, and a generally trapezoidal configuration when acting to increase the spacing between the movable sheave half 12 and fixed sheave half 11. Thus, as seen in FIGS. 1 and 2, the confronting surfaces 33 and 34 defining the axially opposite ends of space 32 are equally oppositely angularly inclined to the shaft axis 37 in pulley 10.

Figure 4:
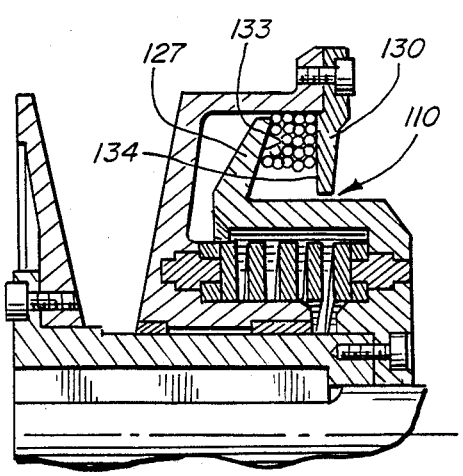
FIG. 4 is a fragmentary diametric section illustrating a modified form of pulley structure embodying the invention.

The invention comprehends other arrangements, such as that shown in FIG. 4 wherein the pulley structure generally designated 110 includes a closure wall 130 defining a radially planar surface 134 confronting the inclined surface 133 on the flange 127.

Figure 5:
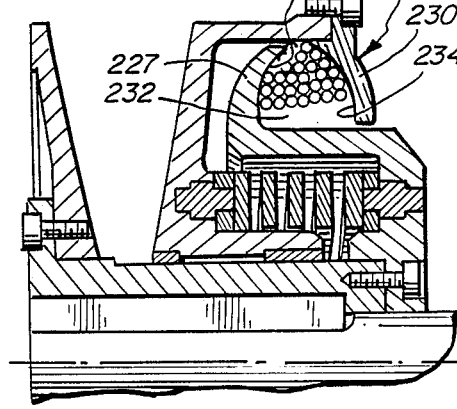
FIG. 5 is a fragmentary diametric section illustrating still another modified form of pulley structure embodying the invention.

In FIG. 5, still another form of variable speed pulley generally designated 210 is provided with a closure wall 230 defining a concave surface 234, and flange 227 defines a complementary concave surface 233.

Figure 6:
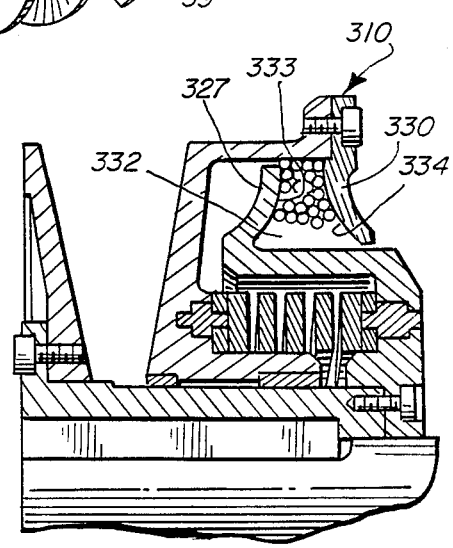
FIG. 6 is a fragmentary diametric section illustrating yet another form of pulley structure embodying the invention.

Still another form of variable speed pulley generally designated 310 is illustrated in FIG. 6 to include a closure wall 330 defining a convex inner surface 334 and flange 327 defines a complementary convex surface 333 defining the axially opposite surfaces of the space 332.

Figure 7:
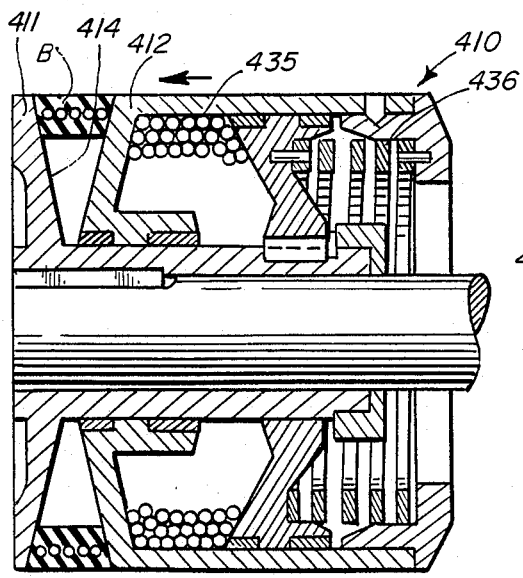
FIG. 7 is a diametric section illustrating yet another form of pulley structure embodying the invention, with the pulley structure arranged to define a maximum effective diameter thereof.
Figure 8:
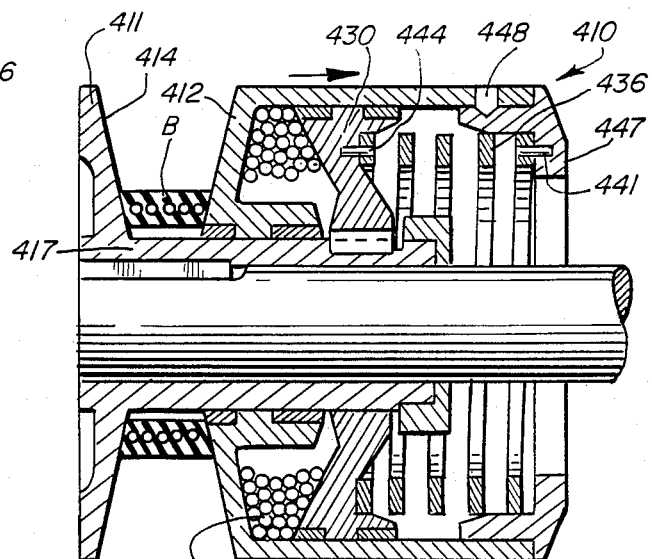
FIG. 8 is a diametric section of the pulley structure of FIG. 7, with the pulley structure arranged to define a minimum effective diameter thereof.
Figure 9:
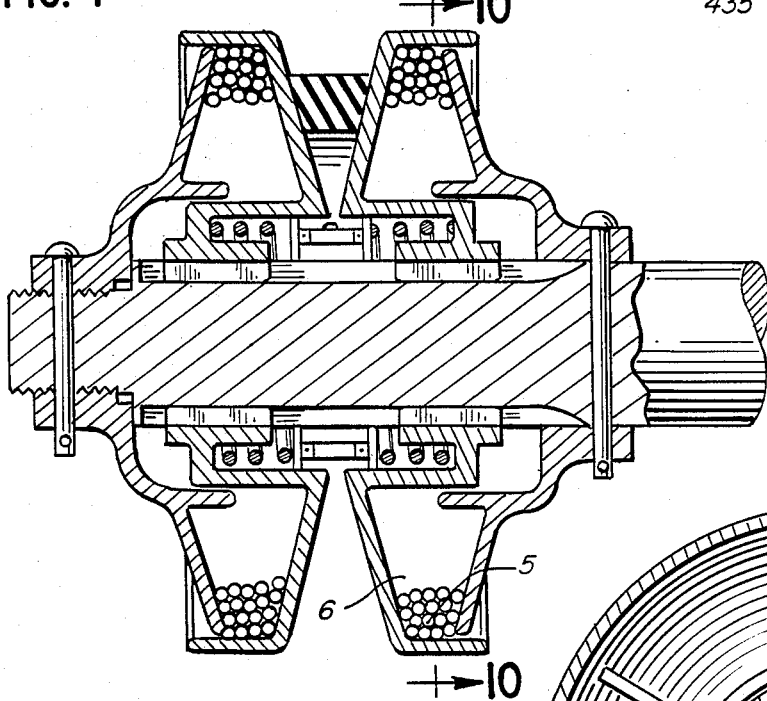
FIG. 9 is a diametric section illustrating a pulley structure of the prior art in which the problem solved by the present invention occurs.
Figure 10:
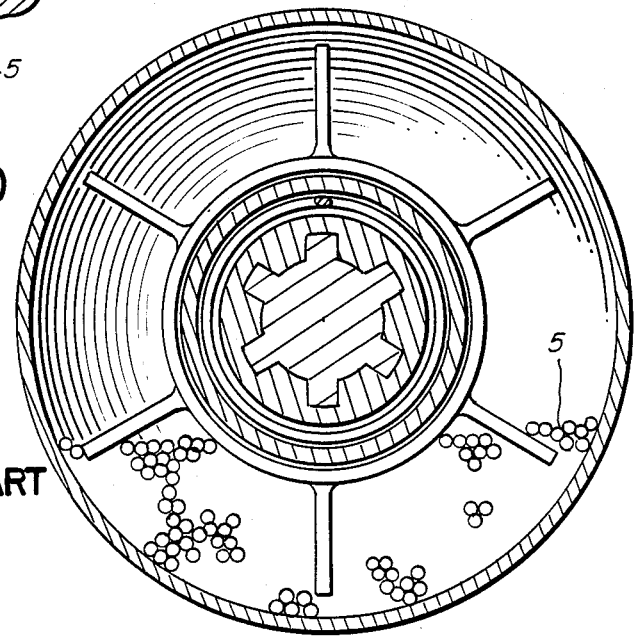
FIG. 10 is a transverse section taken substantially along the line 10—10 of FIG. 9 and illustrating the asymmetrical distribution of the force applying means when the pulley structure is at a standstill.

The spring portion of the rearrangement means is disposed radially inwardly of the force applying elements 35. In FIGS. 7 and 8, a further modified form of pulley structure generally designated 410 comprises a pulley structure wherein the spring 436 of the rearrangement means is disposed axially outwardly of the force applying elements 435. The movable pulley sheave half 412 is rotatably mounted on the sleeve 417 and has an annular spring retainer 447 secured to its distal end by a set screw 448. Spring 436 biases the movable sheave half 412 to the right, as seen in FIG. 8, as a result of its compression between retainer 447 and wall 430 mounted to the sleeve 417. Thus, as shown in FIG. 8, groove 414 of the pulley is urged to its widest configuration whereby the power transmission belt B is disposed in a radially inner portion of the groove.

As the pulley speed increases, the force applying elements 435 are urged by centrifugal force radially outwardly toward the position of FIG. 7, thereby urging the movable sheave half 412 toward fixed sheave half 411 against the biasing action of spring 436. In this arrangement, the drive belt B is disposed in the radially outer portion of the pulley groove 414, whereby the pulley effectively defines its maximum diameter.

Thus, the pulley structure 410 functions similarly to the pulley structures of the embodiments of FIGS. 1–6 except that an increase in the speed of the pulley in pulley structure 410 causes a narrowing of the belt groove, whereas in the embodiments of pulleys 10, 110, 210, and 310, an increase in the speed effects a widening of the pulley groove. In each case, a smooth redistribution of the force applying elements is effected as a result of relative movement between the surfaces defining opposite sides of the space in which the force applying elements are retained. Thus, spring 436, which has its opposite ends connected to spring retainer 447 by a pin 441 and closure wall 430 by a pin 444 permits limited rotative displacement of sheave half 412 relative to sheave half 411 as a result of a change in the force applied by the belt B to the sheave halves as during driving operation of the system.

Thus, the pulley structures of the present invention provide an improved control of the variable width pulley groove thereof. The force applying means is caused to have a smooth uniform distribution, avoiding vibration and noise as a result of its cooperation with the shock absorbing spring means.

The foregoing disclosure of specific embodiments is illustrative of the broad inventive concepts comprehended by the invention.

We claim:

1. A variable speed pulley comprising:
   a first sheave half;
   means for fixedly mounting the first sheave half on a rotatable shaft defining an axis of rotation;
   a second sheave half;
   means for coaxially movably mounting said second sheave half on said shaft adjacent said first sheave half to define a belt receiving groove therebetween;
   means for biasing said second sheave half axially of the shaft to vary the width of said belt receiving groove, said means for biasing said second sheave half comprising means for biasing said second sheave half away from said first sheave half to increase the width of said belt receiving groove;
   means for urging said second sheave half axially of the shaft against the biasing force of said biasing means with a force proportional to the speed of rotation of said shaft to vary the width of said belt receiving groove, said urging means comprising means for urging said second sheave half toward said first sheave half to reduce the width of said belt receiving groove and comprising means movable with said second sheave half defining a movable surface;
   means fixedly associated with said shaft defining a fixed surface;
   force applying means extending between said movable surface and said fixed surface and having a variable extension parallel to said shaft axis proportional to the centrifugal force acting thereon as a result of said speed of rotation of the shaft; and
   rearrangement means for varying the arrangement of said force applying means as an incident of a relative movement between said first and second sheave halves angularly about said axis of rotation.

2. The variable speed pulley of claim 1 wherein said movable and fixed surfaces comprise frustoconical surfaces.

3. The variable speed pulley of claim 1 wherein said movable and fixed surfaces comprise frustoconical surfaces radially outwardly converging.

4. The variable speed pulley of claim 1 wherein said force applying means comprises a plurality of small discrete elements.

5. The variable speed pulley of claim 1 wherein said force applying means comprises a plurality of small spherical elements having a friction-reducing coating.

6. The variable speed pulley of claim 1 wherein said rearrangement means comprises spring means for permitting resilient rotational repositioning of said second sheave half on said shaft.

7. The variable speed pulley of claim 1 wherein said rearrangement means comprises spring means for permitting resilient rotational repositioning of said second sheave half on said shaft as a result of a change in force applied to said second sheave half by a belt in said groove.

8. A variable speed pulley comprising:
a stationary pulley sheave half mounted fixedly to a shaft;
a movable pulley sheave half mounted for rotative and axial movement on the shaft adjacent said stationary pulley sheave half and defining therewith a belt receiving groove;
wall means fixedly mounted to the shaft, said wall means and movable pulley sheave half defining therebetween a chamber;
small spheres in said chamber; and
a spring resiliently coupling said movable pulley sheave half to the shaft and being disposed at all times axially of said chamber.

9. The variable speed pulley of claim 8 wherein said spring comprises a helical spring disposed coaxially of said sheave halves about said shaft.

10. A variable speed pulley comprising:
a first sheave half;
means for fixedly mounting the first sheave half on a rotatable shaft defining an axis of rotation;
a second sheave shaft;
means for coaxially movably mounting said second sheave half on said second shaft adjacent said first sheave half to define a belt receiving groove therebetween;
means for biasing said second sheave half axially of the shaft to vary the width of said belt receiving groove;
means for urging said second sheave half axially of the shaft against the biasing force of said biasing means with a force proportional to the speed of rotation of said shaft to vary the width of said belt receiving groove, said urging means comprising means movable with said second sheave half defining an arcuate movable surface;
means fixedly associated with said shaft defining an arcuate fixed surface and defining with said movable surface a variable volume space;
a plurality of small rounded elements disposed in said space between said movable surface and said fixed surface and having a variable extension parallel to said shaft axis proportional to the centrifugal force acting thereon as a result of said speed of rotation of the shaft; and
spring means for varying the arrangement of said force applying means as an incident of a relative movement between said first and second sheave halves about said axis of rotation.

11. The variable speed pulley of claim 10 wherein said arcuate surfaces are reversely similar in curvature.

12. The variable speed pulley of claim 10 wherein said surfaces defining said space comprises concave arcuate surfaces.

13. The variable speed pulley of claim 10 wherein said surfaces defining said space comprise convex arcuate surfaces.

14. A variable speed pulley comprising:
a first sheave half;
means for fixedly mounting the first sheave half on a rotatable shaft defining an axis of rotation;
a second sheave half;
means for coaxially movably mounting said second sheave half on said shaft adjacent said first sheave half to define a belt receiving groove therebetween;
means for biasing said second sheave half axially of the shaft to vary the width of said belt receiving groove;
means for urging said second sheave half axially of the shaft against the biasing force of said biasing means with a force proportional to the speed of rotation of said shaft to vary the width of said belt receiving groove, said urging means comprising means movable with said second sheave half defining a movable surface;
means fixedly associated with said shaft defining a fixed surface and defining with said movable surface a variable volume space;
a plurality of small rounded elements disposed in said space between said movable surface and said fixed surface and having a variable extension parallel to said shaft axis proportional to the centrifugal force acting thereon as a result of said speed of rotation of the shaft; and
spring means for varying the arrangement of said force applying means as an incident of a relative movement between said first and second sheave halves about said axis of rotation, said means for biasing said second sheave half comprising means for biasing said second sheave half away from said first sheave half to increase the width of said belt receiving groove, and said means for urging said second sheave half axially of the shaft comprising means for urging said second sheave half toward said first sheave half to reduce the width of said belt receiving groove.

15. The variable speed pulley of claim 14 wherein said rounded elements comprise spherical elements.

16. The variable speed pulley of claim 14 wherein said rounded elements comprise spherical elements having a friction-reducing coating.

17. The variable speed pulley of claim 14 wherein said spring means comprises a helical spring coaxial of said shaft.

* * * * *